US012779385B2

(12) United States Patent
Langerak

(10) Patent No.: US 12,779,385 B2
(45) Date of Patent: Nov. 3, 2026

(54) REFILLABLE AIR FILTER SYSTEM

(71) Applicant: Brian Langerak, Ada, MI (US)

(72) Inventor: Brian Langerak, Ada, MI (US)

( * ) Notice: Subject to any disclaimer, the term of this patent is extended or adjusted under 35 U.S.C. 154(b) by 653 days.

(21) Appl. No.: 18/127,033

(22) Filed: Mar. 28, 2023

(65) Prior Publication Data

US 2023/0302389 A1 Sep. 28, 2023

Related U.S. Application Data

(60) Provisional application No. 63/324,305, filed on Mar. 28, 2022.

(51) Int. Cl.

| | |
|---|---|
| ***B01D 46/00*** | (2022.01) |
| ***B01D 46/10*** | (2006.01) |
| ***B01D 46/42*** | (2006.01) |
| ***B01D 46/52*** | (2006.01) |
| ***B01D 46/88*** | (2022.01) |

(52) U.S. Cl.

CPC ..... *B01D 46/0016* (2013.01); *B01D 46/0005* (2013.01); *B01D 46/0015* (2013.01); *B01D 46/10* (2013.01); *B01D 46/4227* (2013.01); *B01D 46/521* (2013.01); *B01D 46/88* (2022.01); *B01D 2265/023* (2013.01); *Y10S 55/31* (2013.01)

(58) Field of Classification Search

CPC ............ B01D 46/0016; B01D 46/0005; B01D 46/0015; B01D 46/10; B01D 46/4227; B01D 46/521; B01D 46/88; B01D 2265/023; Y10S 55/31

See application file for complete search history.

(56) References Cited

U.S. PATENT DOCUMENTS

| | | | | |
|---|---|---|---|---|
| 2,393,419 A | | 1/1946 | Schaaf | |
| 3,789,514 A | * | 2/1974 | Faust | D06F 58/22 34/604 |
| 4,343,401 A | * | 8/1982 | Paulyson | B65D 88/121 410/11 |
| 4,570,844 A | | 2/1986 | Wysocki | |
| 5,196,119 A | * | 3/1993 | Harms | B01D 29/111 210/453 |
| 5,501,794 A | | 3/1996 | Van de Graaf et al. | |
| 5,571,300 A | | 11/1996 | Stemmer | |
| D402,356 S | | 12/1998 | Hodge | |
| 6,033,453 A | | 3/2000 | Weddell, III | |
| 6,740,137 B2 | | 5/2004 | Kubokawa et al. | |
| 6,843,820 B2 | | 1/2005 | Kubokawa | |
| D544,949 S | | 6/2007 | Winters et al. | |
| 8,828,111 B2 | | 9/2014 | Aycock et al. | |
| D732,153 S | | 6/2015 | Sanocki et al. | |
| D754,315 S | | 4/2016 | Morin | |
| D894,360 S | | 8/2020 | Perez | |
| 10,774,871 B1 | * | 9/2020 | Srour | F16C 11/12 |
| 10,994,235 B2 | | 5/2021 | Zhang et al. | |

(Continued)

FOREIGN PATENT DOCUMENTS

| | | |
|---|---|---|
| JP | H11351657 | 12/1999 |

*Primary Examiner* — In Suk C Bullock

(74) *Attorney, Agent, or Firm* — King & Partners, PLC

(57) ABSTRACT

A refillable air filter system, including: a reusable and collapsible frame; and a disposable filter that is releasably securable within the collapsible frame, wherein the filter is convertible between a storage/collapsed configuration and a functional/expanded configuration.

1 Claim, 16 Drawing Sheets

(56) References Cited

U.S. PATENT DOCUMENTS

| | | | | |
|---|---|---|---|---|
| 2004/0089602 | A1* | 5/2004 | Heinrich | B01D 39/1615 210/508 |
| 2004/0172928 | A1* | 9/2004 | Kubokawa | B01D 46/0005 55/497 |
| 2004/0182055 | A1 | 9/2004 | Wynn | |
| 2007/0289271 | A1 | 12/2007 | Justice et al. | |
| 2008/0152548 | A1* | 6/2008 | Clark | A61L 9/205 422/121 |
| 2009/0183474 | A1 | 7/2009 | Workman | |
| 2013/0340400 | A1* | 12/2013 | Minaeeghainipour | B01D 46/10 55/511 |
| 2017/0014743 | A1* | 1/2017 | Varghese | B01D 46/4227 |
| 2018/0168385 | A1* | 6/2018 | Boone | G06Q 30/0621 |
| 2018/0193783 | A1* | 7/2018 | Baldinger | B01D 46/10 |

* cited by examiner

REFILLABLE AIR FILTER SYSTEM

CROSS-REFERENCE TO RELATED APPLICATIONS

This application claims the benefit of U.S. Provisional Application Ser. No. 63/324,305, entitled "REFILLABLE AIR FILTER SYSTEM," filed Mar. 28, 2022—which is hereby incorporated herein by reference in its entirety, including all appendixes and references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to air filter systems, and, more particularly, to refillable air filter systems that include a combination of a reusable collapsible frame and a disposable collapsible filter to create a complete air filter solution. The air filter systems of the present invention fit in small shipping containers compared to traditional air filters and/or associated air filter systems.

2. Background Art

Air filter assemblies have been known in the art for years and are the subject of a plurality of patents and publications, including: U.S. Pat. No. 10,994,235 entitled "Refillable Air Filter Assembly," U.S. Pat. No. 8,828,111 entitled "Collapsible Filter," U.S. Pat. No. 6,843,820 entitled "Filter Assembly," U.S. Pat. No. 6,740,137 entitled "Collapsible Pleated Filter Element," U.S. Pat. No. 6,033,453 entitled "Re-usable Frame Support Rack for Replaceable Pleated-Media Filter Core," U.S. Pat. No. 5,571,300 entitled "Frame and Pad Filter System," U.S. Pat. No. 5,501,794 entitled "Wave Filter with Flexible Tensioning Members," U.S. Pat. No. 4,570,844 entitled "Paperboard Frame with Lockable Corners," U.S. Pat. No. 2,393,419 entitled "Frame for Filters," United States Patent Application Publication Number 2009/0183474 entitled "Air Filter," United States Patent Application Publication Number 2007/0289271 entitled "Nestable, Rigid, Planar Air Filter Frame," United States Patent Application Publication Number 2004/0182055 entitled "Disposable Expandable Air Filter," and Japanese Patent Number H11351657 entitled "Air Conditioner"—all of which are hereby incorporated herein by reference in their entirety including all references cited therein.

U.S. Pat. No. 10,994,235 appears to disclose a frame assembly for releasably maintaining an air filter. In some embodiments, the frame assembly includes a thermoformed body integrally forming a base, opposing side walls, opposing end walls, and at least one closure sub-assembly. The frame assembly is configured to releasable retain an air filter relative to the base via the closure sub-assembly. In other embodiments, the frame assembly defines, in a flat state, foldable side and end panels at the perimeter edges of a central grid panel; the frame assembly can be transitioned to a final state for receiving an air filter by folding the panels. The frame assemblies of the present disclosure are re-usable, allowing a user to replace a "used" air filter with a "new" air filter.

U.S. Pat. No. 8,828,111 appears to disclose a fluid filter having a frame and filter media supported by the frame through which a fluid to be treated is directed. The frame has at least first and second frame assemblies that are reconfigurable to place the filter selectively in: a) a first predetermined operative state; and b) a second predetermined operative state. The frame cooperates with the filter media so that the filter media: i) extends over a first intake area with the filter in the first predetermined operative state; and ii) extends over a second intake area that is different than the first intake area with the filter in the second predetermined operative state.

U.S. Pat. No. 6,843,820 appears to disclose a filter assembly with a frame and a filter element that includes a sheet of filter media with attachment strips at opposite ends. The frame positions the filter element with the filter media across a passageway in the frame and with the attachment strips along opposite end parts of a perimeter portion of the frame. Abutments extend along the perimeter portion between its end parts and along opposite edges of the filter material. Projections on the end parts are engaged in openings in the attachment strips and are spaced from the abutments such that the filter element can be mounted on the frame with either of the attachment strips engaged with the projections at either of the end parts while the filter element can only be mounted on the frame with an inlet surface of the sheet of filter material facing the same direction as a front surface of the frame.

U.S. Pat. No. 6,740,137 appears to disclose a reversibly expandable filter element that includes pleated filter media and a flexible spacing structure attached to the pleated media that provides the pleated media with uniform pleat spacing.

U.S. Pat. No. 6,033,453 appears to disclose a re-usable frame support rack for supporting and retaining an outstretched, replaceable pleated-media filter core. The pleated-media filter core is of a type that has fold lines extending in a transverse direction and that stretches-out/collapses in the longitudinal direction. The support rack has a frame formed of spaced longitudinal rails extending between spaced transverse rails. The frame carries a pressure-differential support system that provides support, in instances when a pressure differential exists across the frame, to the filter core on a low-pressure side thereof. The transverse rails preferably include fingers or like gripping formations for releasably gripping the longitudinal margins of the installed filter core. The longitudinal rails include gates or flaps which have closed and open positions for allowing retention and unobstructed removal in the closed and open positions, respectively, of the longitudinal margins of the installed filter core. Given the foregoing arrangement, the re-usable frame support rack provides convenient removal and replacement of a spent filter core with little fuss.

U.S. Pat. No. 5,571,300 appears to disclose a filter apparatus for a reusable one-piece filter frame housing and a filter media for use in a forced air ventilating system. The one-piece filter frame housing having integrally formed fasteners to releasably secure a replaceable filter media. The filter frame housing further having an "I" beam structure to enhance filter frame strength. The filter frame housing also having an electrostatic charge.

U.S. Pat. No. 5,501,794 appears to disclose a filter system that includes a filter element arranged in wave or zigzag shaped folds and having flat filter element portions and intermediate bending lines. The longitudinal edges of the filter element are connected to tensioning bands. When the filter element is stretched, these tensioning bands are tensioned and in their tensioned condition fulfill a holding function for holding the filter element portions in the stretched condition of the filter element. Thus, no spacers are required on the filter frame for maintaining the stability of shape of the filter element.

U.S. Pat. No. 4,570,844 appears to disclose a frame that is made from a one-piece paperboard blank which is folded and glued into a collapsed shipment and storage configuration. The collapsed frame can be manually expanded for use. The corners of the expanded frame are locked by overlapping tabs to hold the frame in its expanded state. The frame can be used to hold air filters which are used to filter the air entering a hot air furnace.

U.S. Pat. No. 2,393,419 appears to disclose a strong yet cheaply constructed frame of sheet material for an air filter or the like where a frame of polygon shape encircles the filter leaving open front and read faces for the passage of gaseous stream.

United States Patent Application Publication Number 2009/0183474 appears to disclose an HVAC air filter having a frame. The frame includes filtration media and corners designed to allow for the expansion of the frame. The expansion of the frame allows for full nesting of multiple air filters.

United States Patent Application Publication Number 2007/0289271 appears to disclose a nestable frame for planar air filters or other screen-like planar structures. The nestable frame claims to provide all of the following desirable properties at once, namely: 1. simple manufacturing and assembly process, 2. simple design, 3. enhanced structural rigidity, 4. significant space-savings during storage and transport, and 5. simple handling. The filter frame comprises an upper and a lower frame portion with a first leg each, where the peripheral edge of the filter media is clampingly engaged between the first leg of the upper frame portion and the first leg of the lower frame portion. From the first leg, both frame portions extend outwardly with a second leg at an obtuse angle. The frame portions are connected at the outer ends of their second legs with a connecting leg. Alternative embodiments contain straight connection legs at different angles, curved connection legs or a multitude of connection legs, oriented to the outside of the frame or collapsed inwardly into the frame, for various purposes. Yet alternative embodiments include various values for the obtuse angles between the first and second legs of the upper and lower frame portion. While same angles between corresponding legs of both frame portions may allow for easier design of the frame, a larger angle in the lower frame portion may allow for greater rigidity of the frame at the level of the plane of the filter medium.

United States Patent Application Publication Number 2004/0182055 appears to disclose a collapsible expandable air filter assembly that includes an expandable pleated filter media, a filter frame made from a cardboard blank that is pre-scored, slit, creased and die cut to define a central area enabling air passage therethrough, and side and end panels foldable to positions generally normal to the central area to form a perimeter wall about the central area to receive and support the expanded air filter media. A filter grill is formed from a cardboard blank and has an open central area and laterally opposite marginal side and end walls foldable to enable mounting on the filter frame to assist in retaining the filter media within the filter frame. Separating fingers are formed integral with or separate from but connectable to the filter grill and are adopted to be positioned between adjacent expandable pleats to evenly position and secure the filter pleats. The filter frame and filter grill are foldable into compact folded positions of substantially similar size to the collapsed pleated air filter media to enable compact stacking and insertion into a carton for shipping and storage as a kit before assembly. Alternative collapsible disposable air filter embodiments utilize similar expandable pleated filter media but employ filter frames formed from pairs of panel frame members adapted to have their free ends interconnected to form a rectangular frame that receives the expanded filter media, but can be collapsed for stacking with the collapsed pleated filter media and inserted into a carton for shipping and storage as a kit prior to assembly.

Japanese Patent Number H11351657 appears to disclose an air conditioner, a suction grill that is mounted to be openable. A long-life filter folded in steps in a pleat form along a longitudinal direction is detachably attached inside the suction grill in the inlet side of an air passage between an inlet port and an outlet port. The frame of the filter is provided separately from a net part. Step parts corresponding to the folds of the net part are formed along the longitudinally inner wall of the frame. Engaging parts for detachably engaging both the ends of the net part are provided in an inner wall different from the longitudinally inner wall. Reinforcing parts for holding the folds are provided in both side parts in the longitudinal direction of the net part by welding. Engaging holes corresponding to the engaging parts are provided on both the ends of the net part.

While the above-identified patents and publications do appear to disclose various air filter assemblies, none of the above-identified patents and publications appear to provide a refillable air filter system that includes a combination of a reusable and collapsible frame and disposable and collapsible filter to create a complete air filter solution as disclosed herein. Nor do they enable air filter systems to be shipped in small containers compared to traditional air filters.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a refillable air filter system, comprising, consisting essentially of and/or consisting of a reusable and collapsible frame; and a disposable filter that is releasably securable within the frame, wherein the filter is convertible between a storage/collapsed configuration and a functional/expanded configuration.

In a preferred embodiment of the present invention, the air filter system fits in small shipping containers relative to traditional air filters and/or associated air filter systems.

In another preferred embodiment of the present invention, the frame comprises a lower horizontal support member, an upper horizontal support member, and a plurality of vertical support members. The frame may further comprise one or more intermediate horizontal support members frictionally secured to the plurality of vertical support members.

In yet another preferred embodiment of the present invention, the lower horizontal support member comprises a living hinge.

In one preferred embodiment of the present invention, the lower horizontal support member comprises a pair of end cap cavities/chambers for retaining the ends of the disposable filter.

In a preferred implementation of the present invention, the lower horizontal support member comprises channels for frictionally retaining the plurality of vertical support members.

In another preferred implementation of the present invention, the lower horizontal support member comprises one or more magnets for magnetically enclosing the frame.

In yet another preferred implementation of the present invention, the upper and/or lower horizontal support member comprises one or more angled walls for reducing entrapment of debris therefrom.

In one preferred implementation of the present invention, the lower horizontal support member comprises one or more prongs to engage and secure the filter from displacement.

In a preferred embodiment of the present invention, the upper horizontal support member comprises a pair of end cap cavities/chambers for retaining the ends of the disposable filter.

In another preferred embodiment of the present invention, the upper horizontal support member comprises channels for frictionally retaining the plurality of vertical support members.

In yet another preferred embodiment of the present invention, the upper horizontal support member comprises one or more magnets for magnetically enclosing the frame.

In one preferred embodiment of the present invention, the upper horizontal support member includes a finger relief region for assisting with opening the frame.

In a preferred implementation of the present invention, the filter comprises an expandable accordion-like, pleated filter.

In another preferred implementation of the present invention, the filter comprises an expandable non-pleated, mesh filter.

In yet another preferred implementation of the present invention, the filter is compostable within ASTM-D6400 standards.

In a final embodiment of the present invention, the filter is recyclable and/or 100% bio-based.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
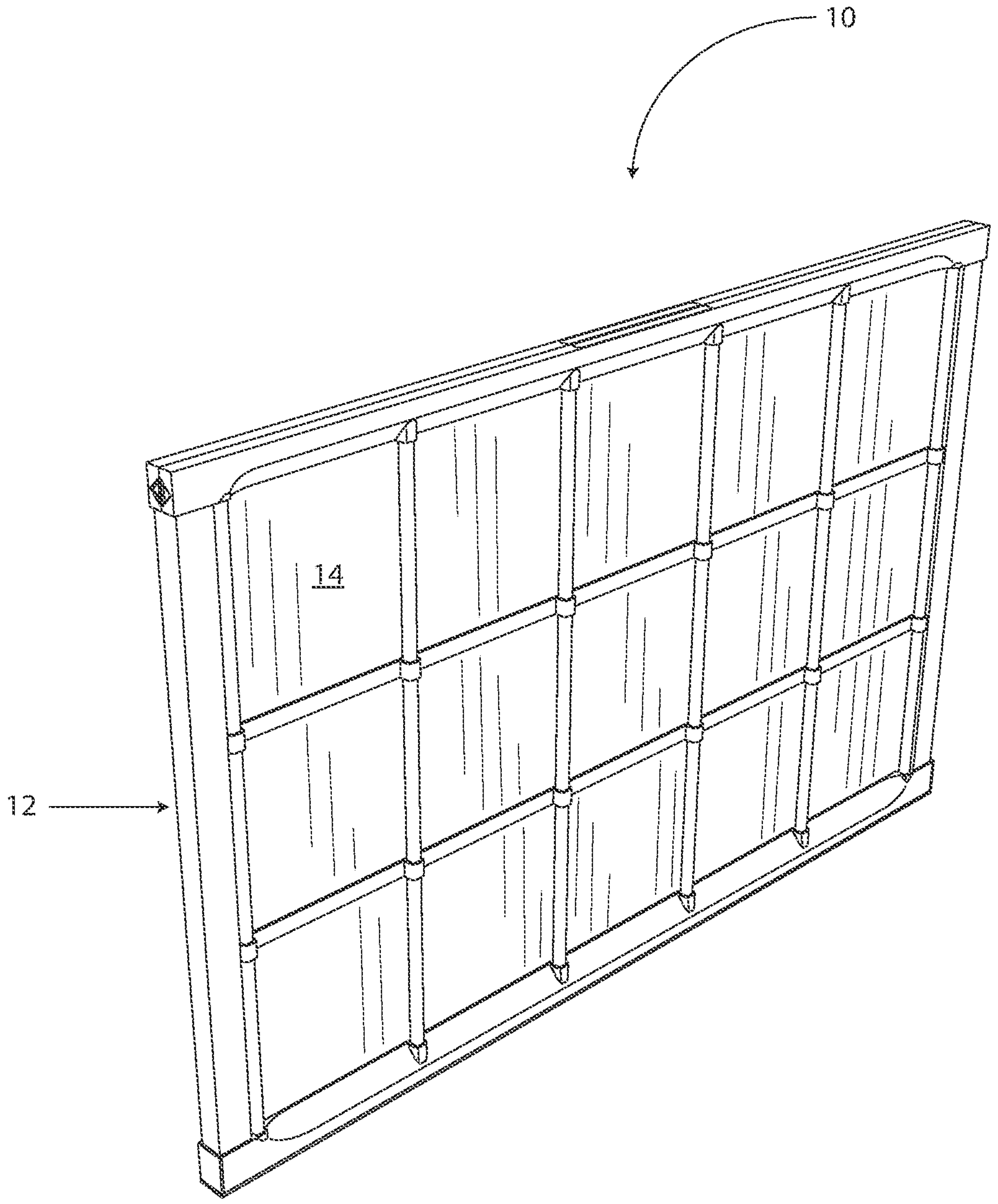
Figure 2:
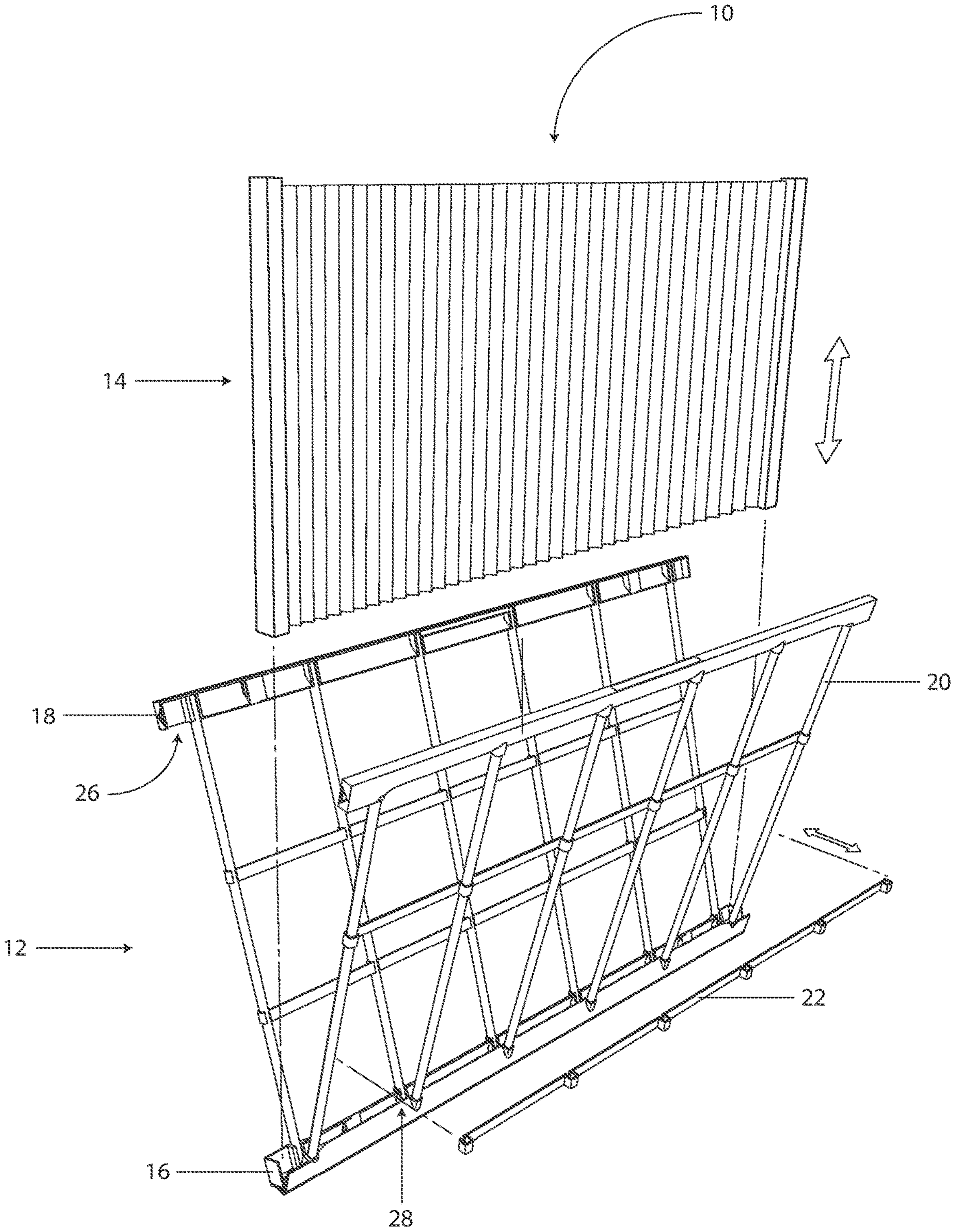
Figure 3:
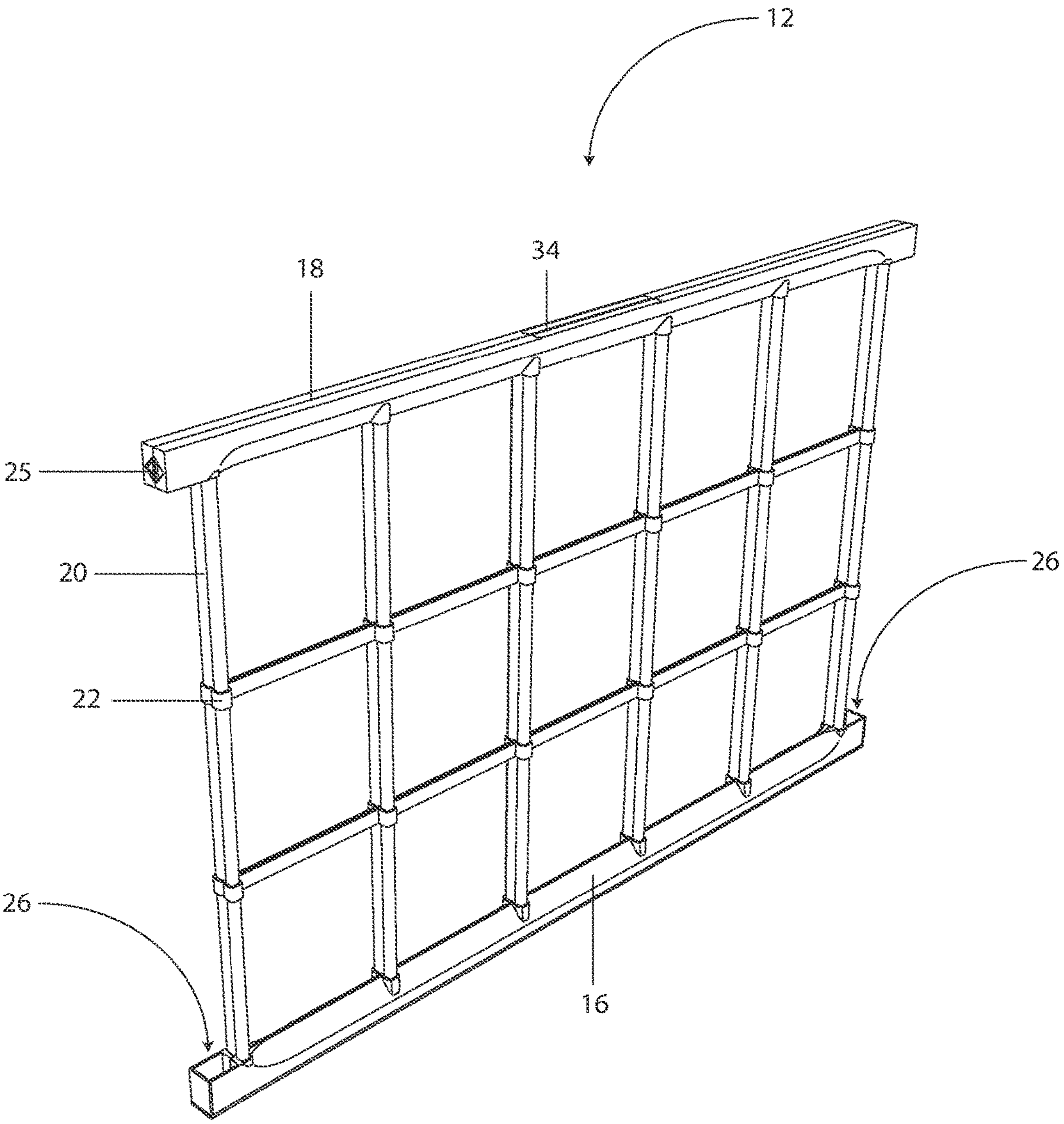
Figure 4:
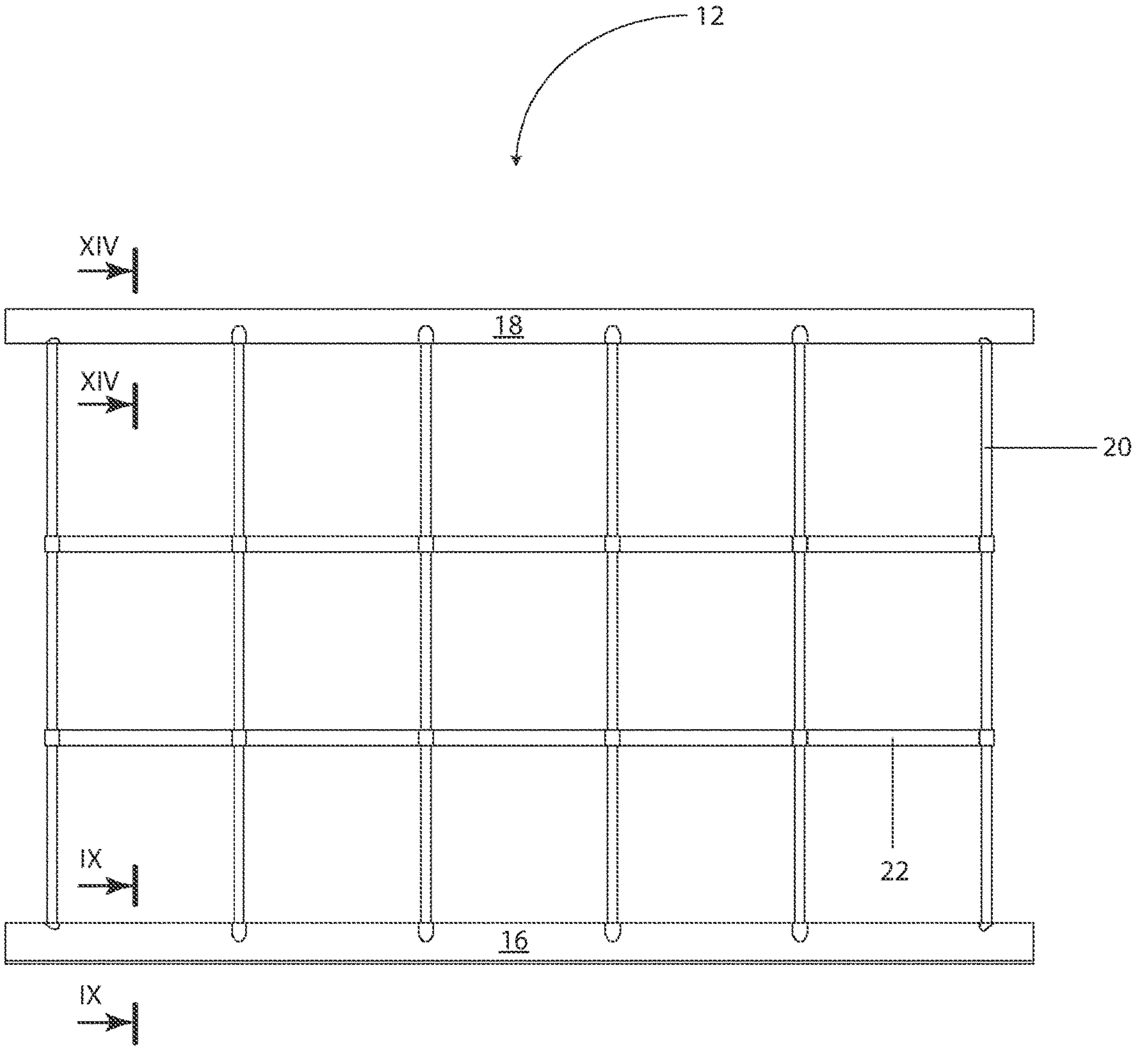
Figure 5:
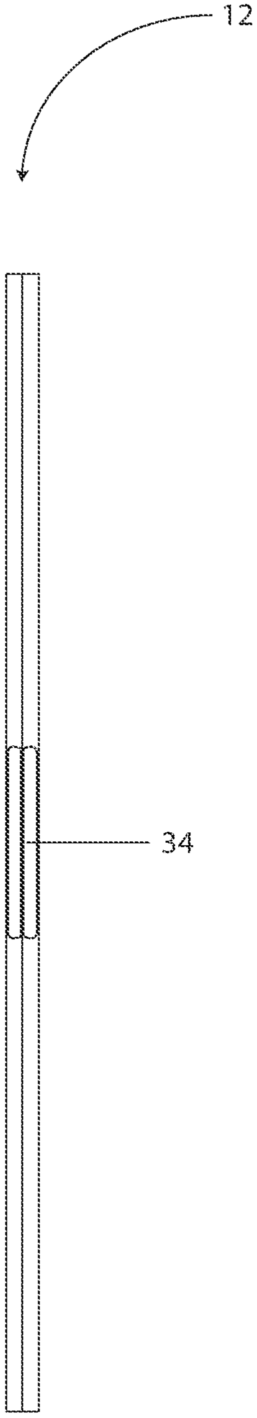
Figure 6:
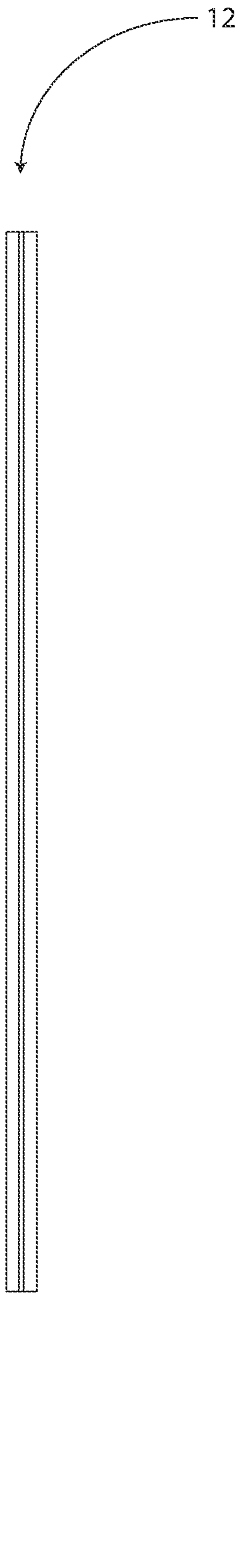
Figure 7:
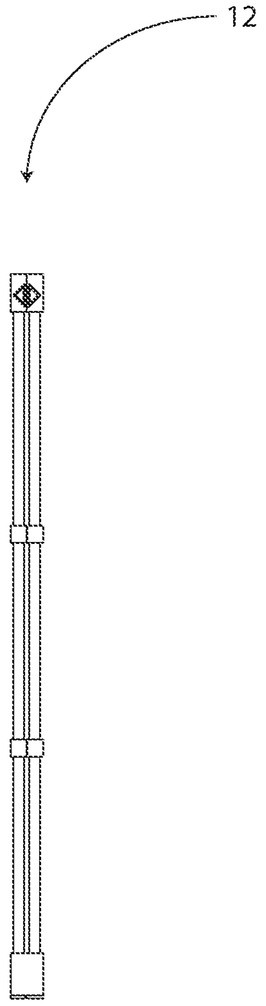
Figure 8:
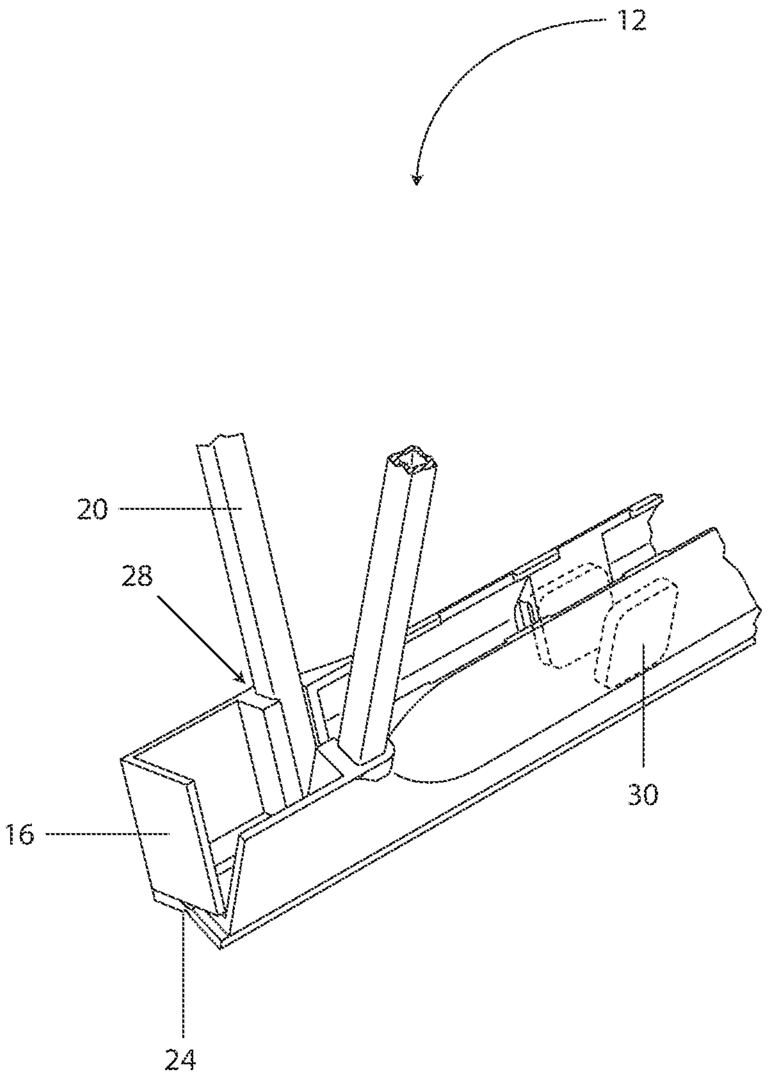
Figure 9:
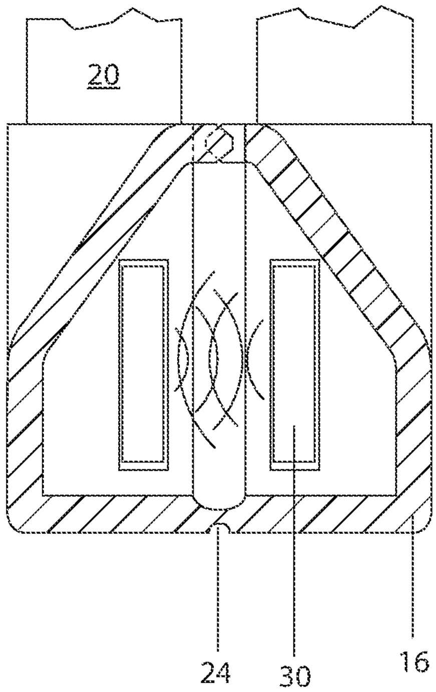
Figure 10:
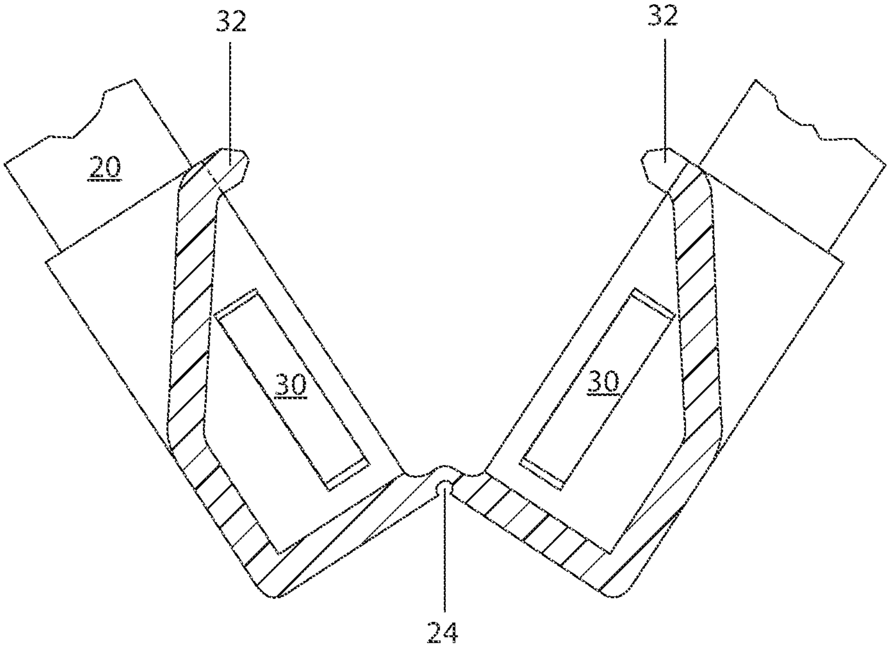
Figure 11:
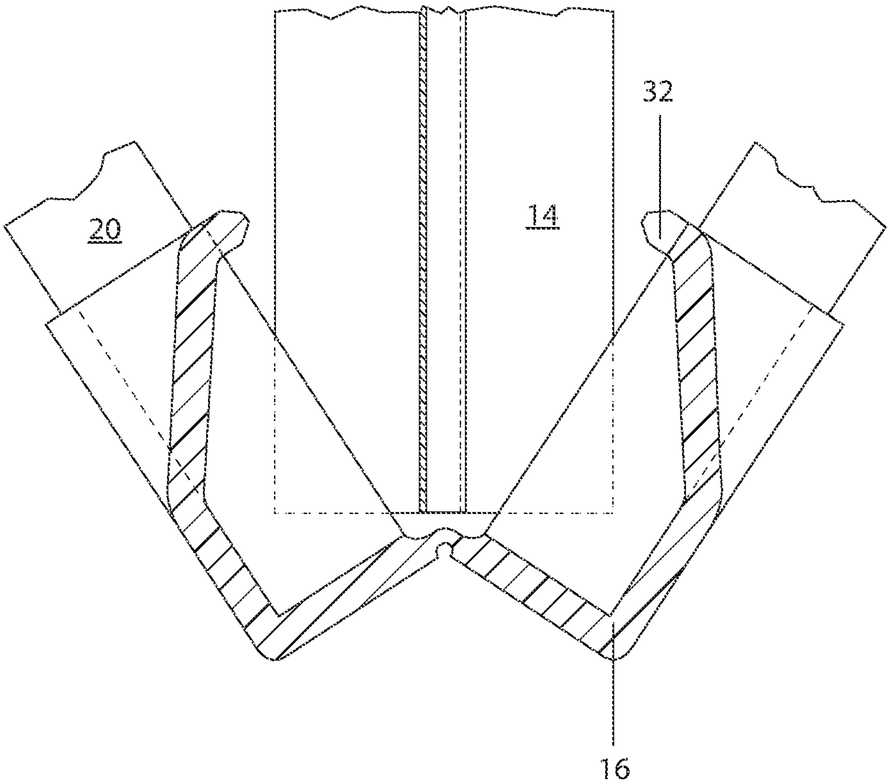
Figure 12:
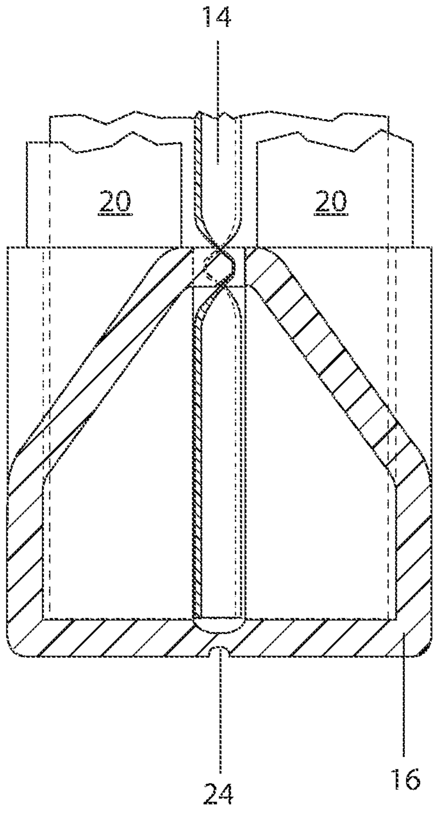
Figure 13:
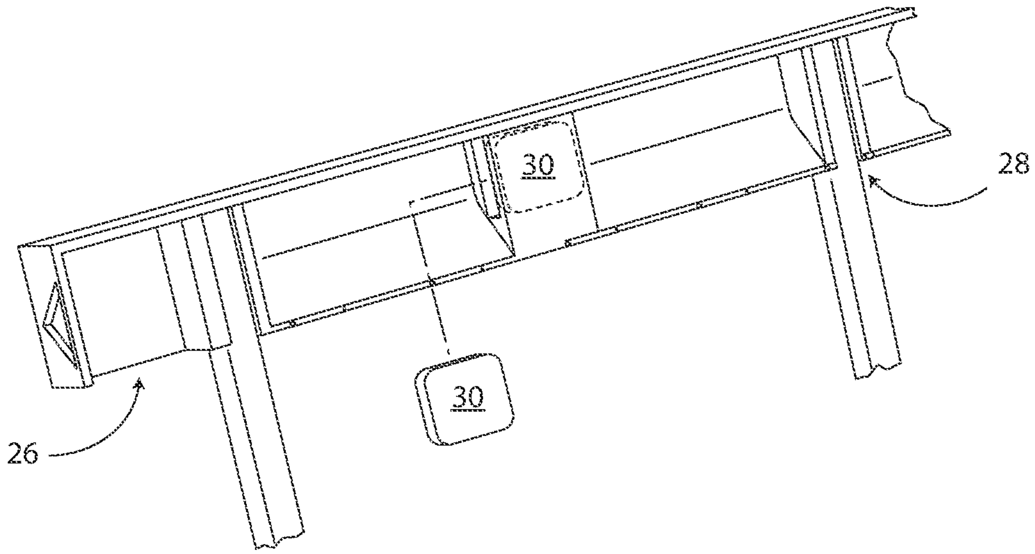
Figure 14:
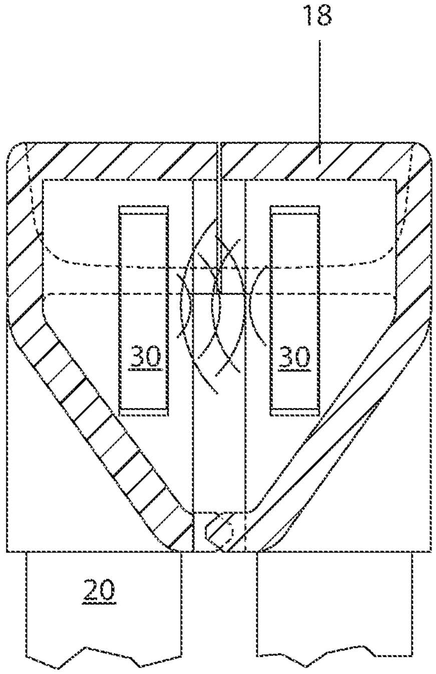
Figure 15:
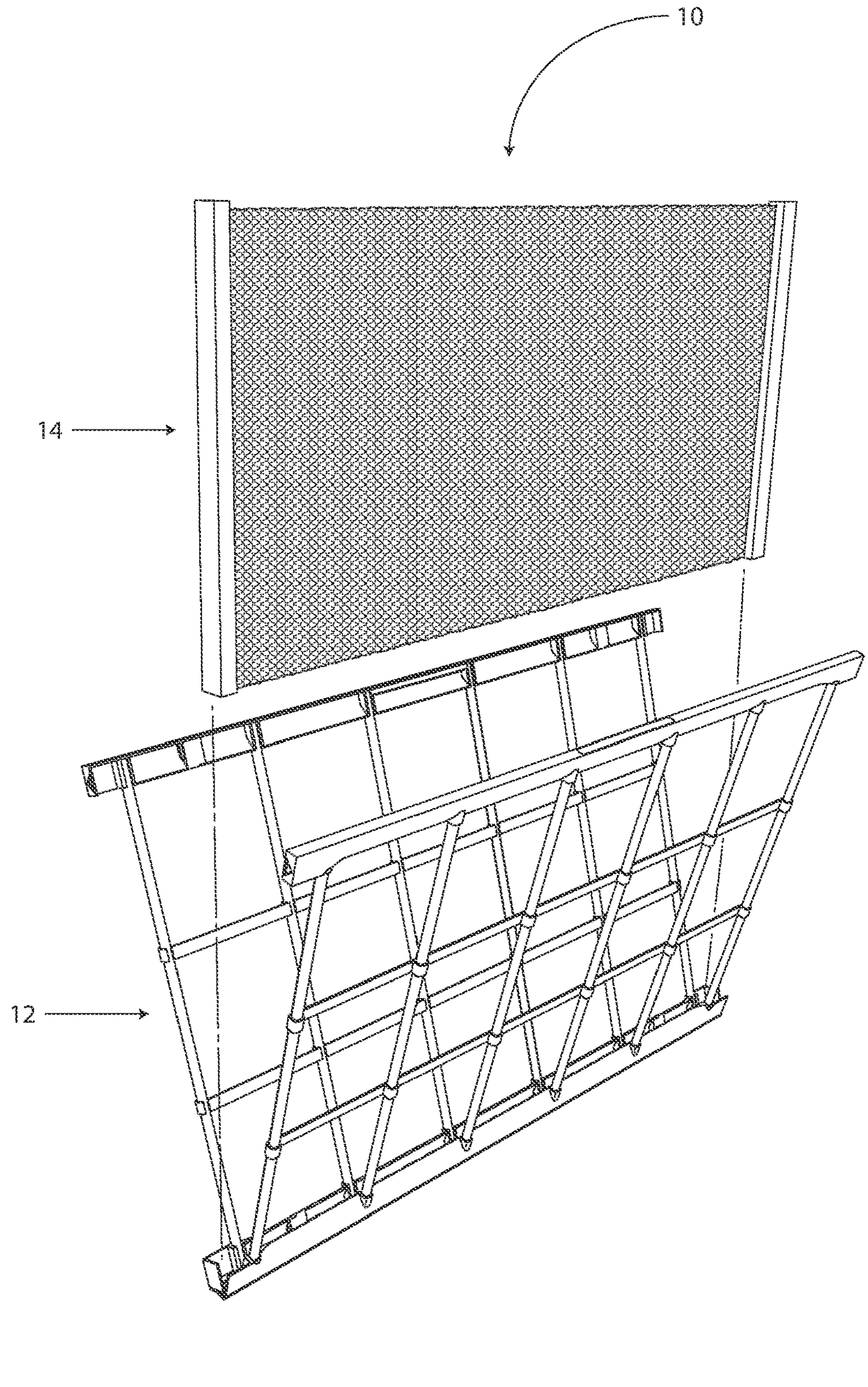
Figure 16:
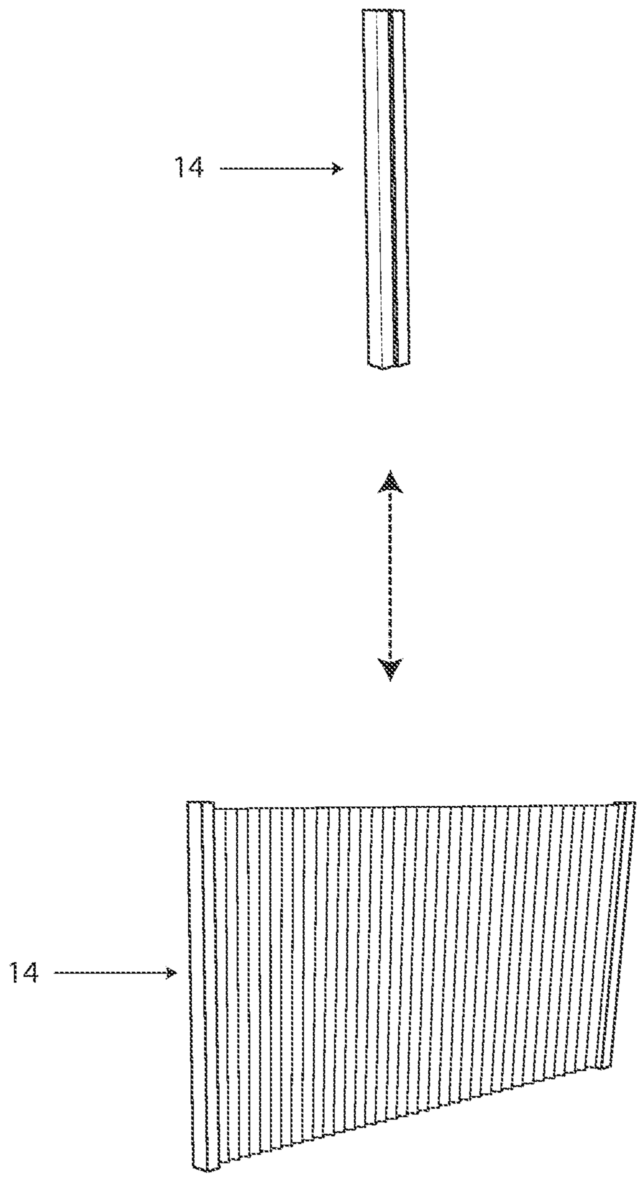

The invention will now be described with reference to the drawings wherein:

FIG. 1 of the drawings is a perspective view of a refillable air filter system of the present invention;

FIG. 2 of the drawings is an exploded perspective view of a refillable air filter system of the present invention;

FIG. 3 of the drawings is a perspective view of a frame of the present invention;

FIG. 4 of the drawings is a front view of a frame of the present invention;

FIG. 5 of the drawings is a top plan view of a frame of the present invention;

FIG. 6 of the drawings is a bottom plan view of a frame of the present invention;

FIG. 7 of the drawings is a side view of a frame of the present invention;

FIG. 8 of the drawings is a fragmented perspective view of a lower horizontal support member showing magnets associated therewith;

FIG. 9 of the drawings is a cross-sectional view of the frame (closed position) taken along line IX of FIG. 4;

FIG. 10 of the drawings is a cross-sectional view of the frame of FIG. 9 shown in an open position;

FIG. 11 of the drawings is a cross-sectional view of the frame of FIG. 10 associated with a filter;

FIG. 12 of the drawings is a cross-sectional view of the frame of FIG. 11 in a closed position;

FIG. 13 of the drawings is a fragmented perspective view of an upper horizontal support member showing magnets associated therewith;

FIG. 14 of the drawings is a cross-sectional view of the frame (closed position) taken along line XIV of FIG. 4;

FIG. 15 of the drawings is an exploded perspective view of an alternative embodiment of a refillable air filter system of the present invention; and FIG. 16 of the drawings is a perspective view of an accordion-type, pleated filter of the present invention shown in a closed and open configuration.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

In accordance with the present invention, the air filter systems and assemblies of the present invention include a reusable and collapsible frame, and a disposable filter that is releasably securable within the frame. The air filter systems and assemblies of the present invention are configured to fit in small shipping containers compared to traditional air filters and/or associated air filter systems.

Referring now to the drawings, and to FIGS. 1-7 in particular, a first embodiment of refillable air filter system or assembly 10, is shown as generally comprising reusable and collapsible frame 12, and disposable filter 14. Filter 14 is preferably releasably securable within the frame, and convertible between a storage/collapsed configuration and a functional/expanded configuration (See FIG. 16).

In a preferred embodiment of the present invention, frame 12 comprises lower horizontal support member 16, upper horizontal support member 18, and one or more (e.g., 1, 2, 3, 4, 5, 6, 7, 8, 9, 10, etcetera) of vertical support members 20.

Frame 12 may optionally comprise one or more (e.g., 1, 2, 3, 4, 5, 6, 7, 8, 9, 10, etcetera) intermediate horizontal support members 22 that are frictionally secured to vertical support members 20.

As is best shown in FIGS. 8 and 9, lower horizontal support member 16 comprises living hinge 24.

Referring now to FIGS. 3 and 8, lower horizontal support member 16 preferably comprises end cap cavities 26 for retaining the ends of the disposable filter.

As is best shown in FIGS. 2 and 8, lower horizontal support member 16 preferably comprises channels 28 for frictionally retaining vertical support members 20.

Referring now to FIGS. 8-10, lower horizontal support member 16 comprises one or more magnets 30 for magnetically enclosing the frame.

As is best shown in FIG. 3, lower horizontal support member 16 preferably comprises one or more angled surfaces (e.g., 30°, 35°, 40°, 45°, 50°, 55°, 60°, 65°, etcetera) relative to the bottom surface of the lower horizontal support member. This angled surface helps to reduce entrapment of debris. It will be understood that the upper horizontal support member may also comprises one or more angled surfaces.

Referring now to FIGS. 10-12, lower horizontal support member 16 preferably comprises one or more prongs 32 to engage and secure filter 14 from displacement.

Referring now to FIGS. 2 and 13, upper horizontal support member 18 comprises end cap cavities 26 for retaining ends of the disposable filter. Upper horizontal support member 18 preferably comprises channels 28 for frictionally retaining vertical support members 20. It will be understood that upper and lower horizontal support members cooperate to retain the vertical support members at each end.

As is best shown in FIGS. 13-14, upper horizontal support member 18 preferably comprises one or more magnets 30 for magnetically enclosing the frame.

As is best shown in FIG. 3, upper horizontal support member 18 preferably includes finger relief region or indent 34 for assisting with opening of the frame.

Frame 12 is preferably fabricated from a unitary or multi-piece of material selected from the group consisting of a metal, a metal alloy, a natural resin, a synthetic resin, a plastic, a composite, fiberglass and/or wood.

As is best shown in FIG. 16, filter 14 preferably comprises an expandable pleated filter. However, filter 14 may also comprise an expandable non-pleated, mesh filter (See FIG. 15). Preferably the filter is made from a material that is compostable within ASTM-D6400 standards, recyclable, and/or 100% bio-based.

Air filter system 10 includes either hinged or non-hinged frame designs. These unique frame designs allows the filter to be used in either direction. There is no need for an airflow direction (i.e., the user can put in the HVAC unit on either side).

In one embodiment of the present invention, the frame ends are supported with a plurality of vertical supports to hold the filter media in place. These supports are designed for a one-time assembly so that the frame itself can ship in an economically and environmentally friendly way.

In accordance with the present invention, to open or close the filter, the frame may deploy a plurality of closing mechanisms including latches, magnetics, tabs, or others to lock the filter in place in a plurality of areas within the frame. With the symmetrical sides which include vertical supports and end walls, the filter can be assembled to lock-in the filter in multiple orientations.

Preferably, the filter expands from a small, condensed box that holds the filter media to become two of the sides of the filter solution. This design accomplished several objectives. First, it allows the filter to ship in one of the smallest and economical form factors. Second, it acts as a supporting wall on two of the sides of the frame. Third, it serves as a convenient containment vessel for the dirty filter, as it can accordion back up and be sealed for recycling/disposal without lofting contaminants around.

In further accordance with the present invention, the top/bottom rail ends come to a termination point where the filter carton encases the filter media and locks it in position. The endpoints of the top/bottom rail may have an accommodation to allow the consumer to interact with the frame or carton end walls to provide a solution for removing the filter at time of replacement.

Advantageously, to assist in the opening of the frame in the sequence of changing filters, finger relief indentations 34 allow for breaking the magnetic seal or other mechanical sealing method which further assist the user in swapping out filters (See FIG. 3).

Preferably, the frame rails (top and bottom, on each side) have an accommodation for a filter extraction point if needed—through die-cut 25 in the filter media carton that can be pushed in and used to help extract the filter from the HVAC filter pocket if need be (See FIG. 3).

In accordance with the present invention, the filter media preferably uses a type of material called a self-supported pleat which by nature of its construction is different than supported pleats. The difference is that self-supported pleats can be expanded/opened or collapsed/closed and contain rigidity so that they are not deformed in the same manner as non-supported pleated filters when under pressure that is found typically in HVAC systems. The use of this specific type of filter media aids in the solutions ability support economical and environmentally efficient shipment of replacement filters. It also allows the user to dispose of used/contaminated filters when replacing conveniently and safely. In this solution the filter media is opened and contains a plurality of pleats which are expanded across the assembled frame to complete two of the four outside edges of the perimeter of the frame.

Additional disclosure pertaining to the refillable air filter system of the present invention is provided in Appendix A of U.S. Provisional Application Ser. No. 63/324,305, entitled “REFILLABLE AIR FILTER SYSTEM,” filed Mar. 28, 2022—which is hereby incorporated herein by reference in its entirety, including all appendixes and references cited therein.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms “comprising,” “including,” “containing,” etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A collapsible air filter frame, consisting of: a lower horizontal support member having a living hinge, a pair of end cap cavities, channels for receiving vertical support members, one or more magnets, and one or more prongs; an upper horizontal support member having a pair of end cap cavities, channels for receiving vertical support members, and one or more magnets; and a plurality of vertical support members that are insertable into and removable from said channels, wherein the living hinge enables folding of the frame between open and closed positions.

* * * * *